UNITED STATES PATENT OFFICE.

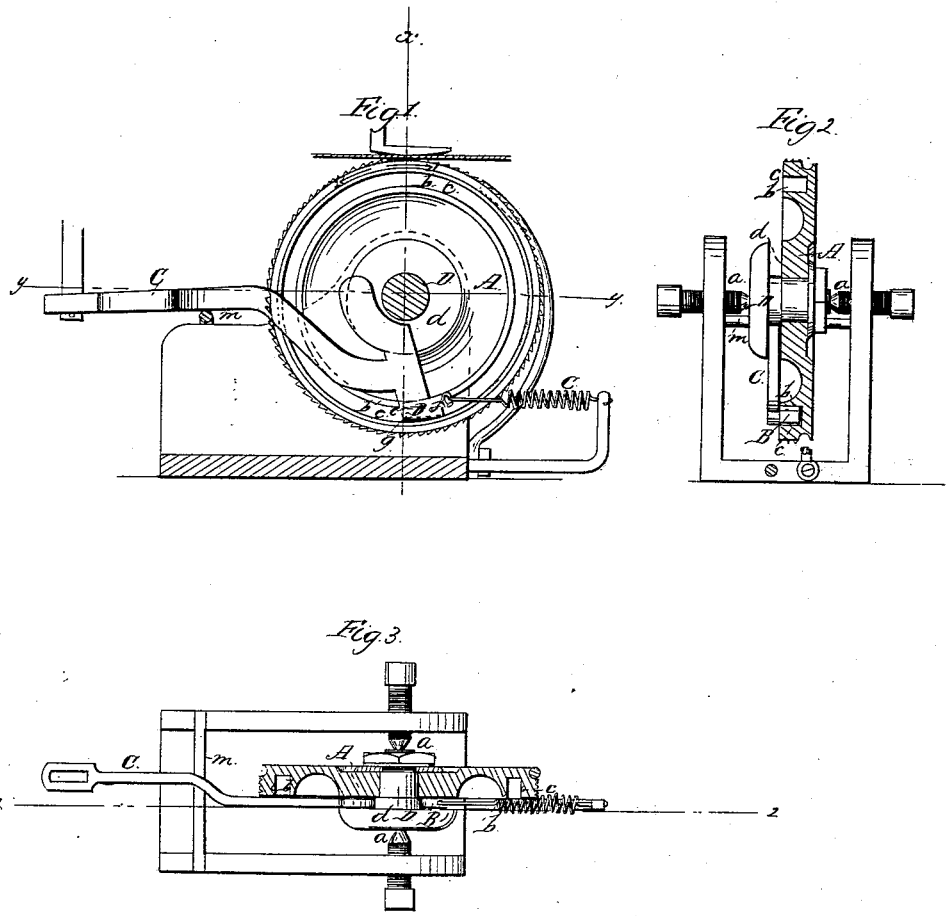

HENRY EHRENFELD, OF NEW YORK, N. Y.

IMPROVED DEVICE FOR CONVERTING RECIPROCATING INTO ALTERNATE CIRCULAR MOTION.

Specification forming part of Letters Patent No. 24,448, dated June 21, 1859.

*To all whom it may concern:*

Be it known that I, HENRY EHRENFELD, of the city, county, and State of New York, have invented a new and Improved Device for Converting Reciprocating into Alternate Circular Motion; and I do hereby declare that the following is a full, clear, and exact description of the same, reference being had to the accompanying drawings, forming a part of this specification, in which—

Figure 1 represents a vertical longitudinal section of my device, the line $z\,z$, Fig. 3, indicating the plane of section. Fig. 2 is a transverse vertical section of the same, taken in the line $x\,x$, Fig. 1. Fig. 3 is a horizontal section of the same, the line $y\,y$, Fig. 1, indicating the plane of section.

Similar letters of reference in the three views indicate corresponding parts.

This invention consists in arranging a lever with a dog in such a manner that the dog acts on a grooved wheel entirely independent from the center or hub of the wheel, and that it can be brought in such a position that by moving the front end of the lever rotary motion may be imparted to the wheel in either direction, the lever being bent and supported in such a manner that when its front end is raised the dog binds in the groove and causes the wheel to rotate, and when the front end of the lever is depressed, the dog slips in the groove and the wheel remains stationary, or vice versa; and the hub of my wheel is provided with a groove, in order to guide the lever and prevent its tipping over in a lateral direction, and in order to keep the dog in the groove of the wheel.

To enable those skilled in the art to fully understand, make, and use my invention, I will proceed to describe its construction and operation.

A represents a wheel, to which an alternate rotary motion is to be imparted. It is fitted between two points, $a\,a$; but it may also be arranged on a revolving shaft, and it has a concentric groove, $b\,c$, turned in one side.

B is a dog, which is rigidly attached to a lever, C, and which fits loosely into the groove $b\,c$. The lever is guided and the dog is kept in the groove $b\,c$ by means of a groove, $d$, in the hub D of the wheel, but it (the lever) moves entirely independent from the center of the wheel, and its back end rests solely on the dog, its front end being attached to a rod, which receives a reciprocating motion from some source, so that the lever receives a vibrating motion, which is converted in its turn in the required alternate circular motion. The dog B is arranged in the groove $b\,c$ in such a manner that the inner edge, $e$, of the dog touches the inner wall, $b$, of the groove, and it will be noticed that when the line $e\,f$, constituting one of the edges of the dog, should be prolonged beyond the point $e$ the flat surface of the dog would rest against the circumference of the inner wall of the groove, and in this latter case, when the front end of the lever is raised, the dog will slip in the groove, and no motion is imparted to the wheel. If, however, the edge $e$ of the dog is in contact with the circumference of the side wall, $b$, of the groove, as represented in Fig. 1 in the drawings, and if the front end of the lever is raised the dog is turned in the groove $b\,c$, so that it binds in the same, and that the wheel is caused to rotate in the direction of arrow 1. In order to keep the lever and the dog in this position, a rod, $m$, is placed under the front end of the lever to prevent its sinking down too low, and the dog is drawn back in the groove by a spring, C, which at the same time serves to bring the lever back to its original position whenever the front end of the same has been raised. The spring, however, is not at all essential in order to keep the dog in the proper position to act on the groove, which will be easily understood if the spring is unhooked. In this case it is only necessary to raise the front end of the lever without imparting to the same a motion from the center of the wheel, which latter would bring the front edge, $e$, of the dog out of contact with the inner wall of the groove $b\,c$, so that the dog will slip without having any effect on the wheel. In the same manner, if the spring is unhooked and the lever be moved in a longitudinal direction until the lower edge, $g$, of the dog comes in contact with the outer wall, $c$, of the groove $b\,c$, and if the front end of the lever is now depressed the wheel will be caused to rotate in the direction of arrow 2, whereas the front end of the lever may now be raised without causing the dog to have any effect on the wheel, and in this case it is still more apparent how my lever and dog operate entirely independent from the center of the wheel, the groove $d$ in the hub serving only to keep the dog B in the groove $b$ $c$ and to prevent the lever tipping over sidewise. This arrangement is particularly adapted as feed for sewing-machines, as it is very simple and perfectly sure in its operation. It may, however, be applied with equal advantage to all sorts of feed-wheels or feed-rollers where an alternate circular motion is required.

Having thus fully described my invention, what I claim as new, and desire to secure by Letters Patent, is—

1. Arranging the lever C and dog B, in combination with the grooved wheel A, or its equivalent, in such a manner that the dog acts on the wheel entirely independent from the center or hub of the wheel, and that the lever can be brought in such a position as to impart motion to the wheel in either direction, substantially as and for the purpose specified.

2. In combination with the lever C, dog B, and wheel A, the arrangement of the groove $d$, or its equivalent, in the hub of the wheel, for the purpose of keeping the dog in the proper position and to prevent the lever from tipping over sidewise, substantially as herein specified.

HENRY EHRENFELD.

Witnesses:
R. S. SPENCER,
WM. TUSCH.